Oct. 18, 1966    E. R. BARNETT ETAL    3,279,447
POWER UNIT
Filed Feb. 14, 1966
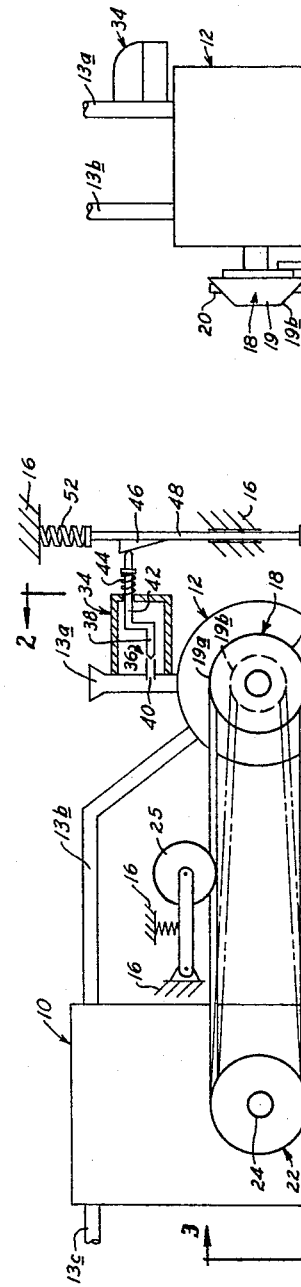
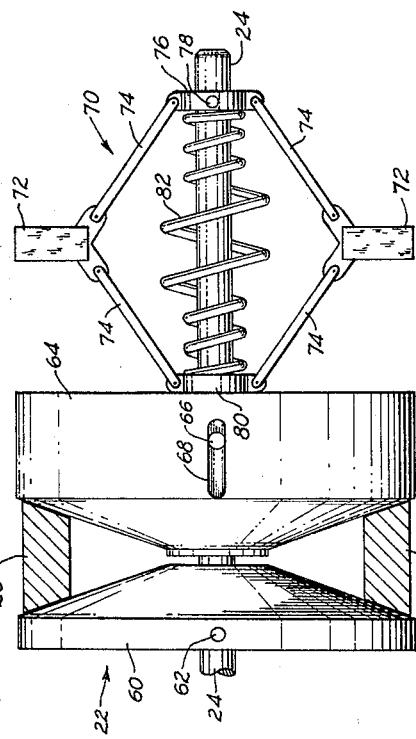
EUGENE R. BARNETT
WILLARD L. BARNETT
INVENTORS
BY Robert A. Spray
ATTORNEY 3,279,447
POWER UNIT
Eugene R. Barnett, 6268 Windsor Drive, and Willard L. Barnett, 3367 W. Michigan St., both of Indianapolis, Ind.
Filed Feb. 14, 1966, Ser. No. 527,379
14 Claims. (Cl. 123—119)

This application is a continuation-in-part of applicants' co-pending application, Serial No. 389,864, filed August 17, 1964, for "Power Unit," which application is now abandoned; and the present application adds to that application a means of delivery of engine power to the blower at a generally constant take-off belt speed, regardless of engine speed.

This invention relates to a power means, such as an internal combustion engine, and more particularly, to a novel means of controlling the amount of fuel and air input into an internal combustion engine.

Various sorts of fuel-air supplying devices (including carburetors, chokes, and fuel-injection systems) have been used, and superchargers have also been used, toward the end of providing engine speed variations and increase of engine power. But all have, especially at certain speeds and in certain loading and acceleration situations, disadvantages of incomplete combustion, and inefficiency of combustion and power, due to improper mixture of air and fuel, the normal difficulty in such situations being too rich a mixture (too much fuel per unit of air) if the mixture has been adjusted so as to be not too lean in another operating situation.

It is the general object of the present invention to provide improved overall combustion efficiency at varying requirements of speed and load; and, to that end, as shown herein in an engine having a supercharger-type blower, the present invention provides a novel and advantageous means which varies the fuel-air mixture (the ratio of fuel and air) and which also varies the volume of a constant fuel-air mixture, both variations being effected while the engine is operating and both being effected automatically in accordance with the setting of the throttle by which the operator regulates engine speed.

The invention thus provides control and delivery of a more nearly optimum fuel-air mixture throughout a wide range of speeds, accelerations and decelerations, and other load and power requirements.

Not only is operating economy and performance improved, by minimizing the tendency to deliver to the engine a fuel-air mixture which is either too lean or too rich, but health and atmosphere conditions will be improved, by avoiding the injurious and smog-contributing unburned particles of fuel which are a result of incomplete combustion due to a too rich a mixture.

The above description is quite introductory and general; and the above and more specific concepts, components, features, and advantages of the present invention will be more further apparent from the following more detailed description of an illustrative embodiment thereof, reference being had to the accompanying, somewhat diagrammatic and schematic drawings, in which:

FIG. 1 is an elevational view of a power means embodying concepts of the present invention;

FIG. 2 is a partial side view thereof, taken generally as indicated by view-line 2—2 of FIG. 1; and FIG. 3 is an enlarged fragmental view of the power take-off means, the view being taken generally as indicated by view line 3—3 of FIG. 1.

As shown in the drawings, a power means according to the present invention generally comprises an engine 10 of a type which is operated by combustion of fuel-air, and a compression means such as a blower 12 which may be of a supercharger type. Air is admitted through an intake line 13a to the blower 12, and is discharged from the blower 12 through output conduit 13b to the associated intake manifold (not shown) of the engine 10, the engine exhaust being indicated at 13c.

A throttle means 14, shown here as of a conventional foot-pedal type, is manipulatable by the engine operator to control the engine speed; and the associated vehicle or other mounting for the engine is indicated by the framing portions 16.

The blower 12 is shown as driven by a variable speed drive 18, including a variable diameter pulley 19, the pulley 19 being driven by a pulley belt 20 which is driven by a generally constant speed power means, generally designated by reference numeral 22 and described in detail hereinafter, which is shown driven by the engine crankshaft 24. An idler pulley 25 is shown to maintain pulley tension.

A control means 26 is operatively connected to the linkage 28 of the throttle 14, as by the elongated slot connection 30, and is operative to adjust the effective diameter of the variable speed pulley 19. This control operation is such that as the throttle 14 is depressed (to accomplish the purpose of increasing engine speed from the relatively slower speed indicated by the setting of the parts in the drawing) the control member 27 adjusts the pulley belt 20 from a relatively larger diameter 19a to a relatively smaller diameter 19b, the pulley belt in the latter setting being shown in the chain-line position.

Thus, the speed of rotation of the blower 12, and hence also its fuel-air output, is related to the speed of the engine in such a manner that the relative speed of the engine and the blower is automatically adjusted in accordance with the setting of the associated throttle 14. Thus, not only is the speed (and the output) of the blower 12 correlated to the speed of the engine 10, but the ratio of the blower speed to engine speed is automatically adjusted by speed responsive variable pulley 22, as shown in FIG. 3, and described in more detail hereinafter.

The fuel, which enters the blower intake 13a, is metered by the fuel-metering means shown generally by reference numeral 34, which may include a carburetor or injection means (not shown). A needle valve 36 is shown as comprising a needle 38 and a mating tube 40, the tube 40 communicating with intake line 13a; and the needle 38 is carried on a shaft 42 which is biased by a spring 44 to open setting of the needle valve 36. However, when the parts are in the relatively slow or idle engine setting shown in the drawing, the open setting of the needle shaft 42 is prevented by the cam lobe 46. The cam lobe 46 is carried on a cam shaft 48 having an adjustment means such as a turnbuckle 50, the shaft 48 being biased as by a spring 52 to a setting which presents the high portion of the cam lobe 46 against the needle shaft 42 (a relatively slow or idle setting). The position or setting of the cam shaft 48 is shown as responsive to a cam lobe 54 shown as carried by the throttle linkage 28.

Thus (again assuming a desire to increase engine speed from the idle position shown), as the throttle 14 is depressed, the linkage 28 will move the cam lobe 54 rightwardly, in turn raising cam shaft 48, allowing the needle shaft 42 to move rightwardly to open the needle valve 36.

The generally constant speed power for the blower 12 is shown by the engine take-off 22 shown in FIG. 3. As there shown, a variable pitch pulley is provided by a first pulley part 60 keyed as by a pin 62 to the engine power takeoff shaft 24, and by a second pulley part 64 which is rotatably keyed to shaft 24 as by a pin 66 but axially movable with respect to the shaft 24 by the elongated slot 68 in the pulley part 64.

A governor 70 is shown as operative to regulate the axial location of pulley part 64. The governor 70 shown includes weights 72 held by freely movable links 74 connected to a collar 76 fixed as by pin 78 to the shaft 24 and also connected to a sliding collar 80 fixed to pulley part 64; and a spring 82 bottoms against the collars 76 and 80, and surrounds the shaft 24. (The spring 82 is shown as having a non-constant spring constant, as indicated schematically by non-uniform turnings, to offset effects of geometry and inertia-effect of the links 74 and to offset centrifugal force variations of different rotary speeds of the shaft 24.)

In operation, it will be noted that at low speed of engine takeoff shaft 24, the spring 82 urges the pulley part 64 (leftwardly) to maintain the belt 20 engagement with pulley parts 60 and 64 at a relatively high radial distance. However, as engine speed raises the speed of shaft 24, the centrifugal effect of weights 72 causes them to move outwardly, pulling collar 80 and pulley part 64 (rightwardly against bias of spring 82) to spread the pulley parts 60 and 64 and permit the belt 20 to engage them at a relative short radial distance.

Accordingly, a generally constant take-off speed of belt 20 is achieved, regardless of engine speed and of its take-off shaft 24.

Thus, variation in fuel-air mixture is also obtained; and this variation, like the heretofore-described variation of the ratio of blower speed and output to engine speed, is obtained while the engine is operating, and is obtained automatically thus improving the nature and amount of the fuel-air delivery to the engine.

A power unit according to the novel concepts of the invention thus provides the desirable advantages of control of fuel-air mixture, more specifically, control of both the nature of the mixture and the volume of the mixture; thus providing more nearly optimum utilization of fuel at varying conditions and requirements, improving economy and performance, and reducing exhaust gas difficulties.

Accordingly, it will thus be seen from the foregoing description of the invention according to this illustrative embodiment, considered with the accompanying drawing, that the present invention provides a new and useful power means, having desired advantages and characteristics, and accomplishing its intended objects, including those hereinbefore pointed out and others which are inherent in the invention.

It will be understood that modifications and variations may be effected without departing from the scope of the novel concepts of the present invention; accordingly, the invention is not to be considered limited to the specific form or arrangement herein described and shown.

What is claimed is:

1. A power means having an operator controllable throttle means for varying the speed thereof, comprising:
   an engine operated by combustion of fuel-air;
   a compression means adapted to supply fuel-air under pressure to said engine;
   a variable speed drive means for driving said compression means;
   driving means powered by said engine for driving said drive means; and
   control means, responsive to the setting of the throttle means, for controlling the setting of the variable speed drive means, whereby the relative speed of said engine and said compression means is automatically adjusted in accordance with the setting of the throttle means, and control means, also responsive to the setting of the throttle means, for controlling the amount of fuel delivery also in accordance with engine setting.

2. A power means having an operator controllable throttle means for varying the speed thereof, comprising:
   an engine operated by combustion of fuel-air;
   a compression means adapted to supply fuel-air under pressure to said engine;
   a variable speed drive means for driving said compression means;
   driving means, driven at a speed correlated to the speed of said engine, for driving said drive means; and
   control means, including actuating means the setting of which is correlated to the setting of the throttle means, for controlling the setting of the variable speed drive means, whereby the relative speed of said engine and said compression means is automatically adjusted in accordance with the setting of the throttle means, and control means, also responsive to the setting of the throttle means, for controlling the amount of fuel delivery also in accordance with engine setting.

3. A power means having an operator controllable throttle means for varying the speed thereof, comprising:
   an engine operated by combustion of fuel-air;
   a compression means adapted to supply fuel-air under pressure to said engine;
   a variable speed pulley means for driving said compression means;
   a driving pulley powered by said engine for driving said pulley means; and
   control means, operatively connected to the throttle means, for controlling the setting of the variable speed pulley means, whereby the relative speed of said engine and said compression means is automatically adjusted in accordance with the setting of the throttle means, and control means, also responsive to the setting of the throttle means, for controlling the amount of fuel delivery also in accordance with engine setting.

4. A power means having an operator controllable throttle means for varying the speed thereof, comprising:
   an engine operated by combustion of fuel-air;
   a variable output compression means adapted to supply fuel-air under pressure to said engine;
   a drive means for driving said compression means; and
   control means, responsive to the setting of the throttle means, for controlling the output of the compression means, in a manner such that the relation between the speed of said engine and the output of said compression means is automatically adjusted in accordance with the setting of the throttle means, and control means, also responsive to the setting of the throttle means, for controlling the amount of fuel delivery also in accordance with engine setting.

5. A power means, comprising:
   an engine operated by combustion of fuel-air;
   a variable output means adapted to supply fuel-air under pressure to said engine;
   a drive means for driving said compression means; and
   control means, the setting of which is correlated to the speed of the engine, for controlling the output of the compression means, in a manner such that the relation between the speed of said engine and the output of said compression means is automatically adjusted in accordance with the speed of the engine, and control means, also responsive to the setting of the throttle means, for controlling the amount of fuel delivery also in accordance with engine setting.

6. A power means having an operator controllable throttle means for varying the speed thereof, comprising:
   an engine operated by combustion of fuel-air;
   a compression means adapted to supply fuel-air under pressure to said engine;
   a fuel-supply means for said engine;
   control means for varying the ratio of the speed and the fuel-air output of said compression means with respect to the engine speed, and for varying the amount of fuel discharged from said fuel-supply means;
   the control means being operatively connected with the throttle means of the engine, providing that both type variations are obtained automatically and in response to the setting of said throttle means.

7. A power means having an operator controllable throttle means for varying the speed thereof, comprising:
an engine operated by combustion of fuel-air;
a compression means adapted to supply fuel-air under pressure to said engine;
a fuel-supply means for said engine;
control means for varying the ratio of the speed and the fuel-air output of said compression means with respect to the engine speed, and for varying the amount of fuel discharged from said fuel-supply means, providing that both type variations are obtained by the setting of the control means.

8. A power means as set forth in claim 1, including generally constant speed means which provides that the driving means powered by the said engine provides generally constant speed drive to the said variable speed drive means regardless of engine speed.

9. A power means as set forth in claim 2, including variable speed drive means operatively connected to the driving means and the drive means to provide generally constant speed drive to the said variable speed drive means regardless of engine speed.

10. A power means as set forth in claim 3, in which the driving pulley is of variable nature and provided with an engine-speed-responsive control, so that the driving pulley imparts generally constant speed to its associated pulley belt regardless of engine speed.

11. A power means as set forth in claim 4, in which the drive means includes a power takeoff from said engine, an engine-speed-responsive control, and a variable speed drive powered from said power takeoff but controlled by said engine-speed-responsive control.

12. A power means as set forth in claim 5, in which the drive means includes a power takeoff from said engine, an engine-speed-responsive control, and a variable speed drive powered from said power takeoff but controlled by said engine-speed-responsive control.

13. A power means as set forth in claim 6, including drive means for said compression means, the drive means including a power takeoff from said engine, an engine-speed-responsive control, and a variable speed drive powered from said power takeoff but controlled by said engine-speed-responsive control.

14. A power means as set forth in claim 7, including drive means for said compression means, the drive means including a power takeoff from said engine, an engine-speed-responsive control, and a variable speed drive powered from said power takeoff but controlled by said engine-speed-responsive control.

References Cited by the Examiner

UNITED STATES PATENTS

| 1,816,737 | 7/1931 | Moss | 123—119 |
| 2,297,237 | 9/1942 | Nallinger | 123—119 |

FOREIGN PATENTS

| 265,369 | 2/1927 | Great Britain. |

MARK NEWMAN, *Primary Examiner.*

A. L. SMITH, *Assistant Examiner.*